United States Patent [19]
Bell et al.

[11] Patent Number: 5,935,215
[45] Date of Patent: Aug. 10, 1999

[54] METHODS AND SYSTEMS FOR ACTIVELY UPDATING ROUTING IN TCP/IP CONNECTIONS USING TCP/IP MESSAGES

[75] Inventors: Jon Anthony Bell, Raleigh; Edward Glen Britton, Chapel Hill, both of N.C.; Alfred Bundgaard Christensen, Spoettrup, Germany

[73] Assignee: International Business Machines Corporation, Armonk, N.Y.

[21] Appl. No.: 08/822,973

[22] Filed: Mar. 21, 1997

[51] Int. Cl.⁶ .................................................. G06F 13/00
[52] U.S. Cl. ............................................. 709/239; 714/43
[58] Field of Search ................... 395/200.68, 200.69, 395/200.72, 200.54, 183.19, 182.02; 370/245; 709/238, 239, 242, 224; 714/43, 4

[56] References Cited

U.S. PATENT DOCUMENTS

| | | | |
|---|---|---|---|
| 4,905,233 | 2/1990 | Cain et al. ............................ | 370/237 |
| 5,119,488 | 6/1992 | Takamatsu et al. ................ | 395/182.02 |
| 5,239,537 | 8/1993 | Sakauchi .............................. | 370/218 |
| 5,513,345 | 4/1996 | Sato et al. ........................... | 395/182.02 |
| 5,757,810 | 5/1998 | Fall ....................................... | 371/5.1 |
| 5,805,593 | 9/1998 | Busche ................................. | 370/396 |
| 5,809,251 | 9/1998 | May et al. ........................... | 395/200.53 |

*Primary Examiner*—Zarni Maung
*Attorney, Agent, or Firm*—Jeanine S. Ray-Yarletts

[57] ABSTRACT

A method of allowing TCP/IP resources to be rerouted to another active link connected to the same resources in a timely manner. This method comprises sending a Routing Information Protocol (RIP) update to the router by sending information to the other resource specifying a metric that indicates that the desired network is unreachable; this RIP update is sent with the IP source address set as if it had been transmitted across the failed link. This causes the route to be updated to indicate that the failing link is no longer active and indicate an alternate route as the preferred means of reaching the resource.

8 Claims, 8 Drawing Sheets

METHODS AND SYSTEMS FOR ACTIVELY UPDATING ROUTING IN TCP/IP CONNECTIONS USING TCP/IP MESSAGES

TCP/IP (Transmission Control Protocol/Internet Protocol) is the transport mechanism underlying the Internet. It is also the underlying protocol for many intranets and business applications in existence today. TCP/IP was started as an educational and scientific network. It was not designed to handle high-volume traffic with the requirement of availability 7 days per week, 24 hours per day. Because of this design point, there were few backup or redundancy measures incorporated into TCP/IP.

Through the growth of the Internet, which includes the world wide web, requirements have arisen for higher availability and greater reliability for host TCP/IP networks. This has become especially true where the TCP/IP host controls business applications or transactions. The design of TCP/IP is such that each physical network interface adapter has associated with it an address. This is unique within the entire network and is the method by which all other devices communicate with the adapter or the devices connected through the adapter. If a given TCP/IP host has multiple interface adapters, the user communicating with the host must select an interface adapter which they chose to use. The user must then reference the host by the address of the particular adapter which the user has chosen to use.

The above method works well when each host has one interface adapter or where the interface adapters never fail, but in large host systems where there are more than one interface adapter available to a host, situations arise where one of the interface adapters fails. When this happens, if the host has configured a virtual IP address (VIPA), then traffic that was entering the host through the now failed adapter can be re-routed to the host through one of the still working interface adapters. However, if the host has two or more adapters, all of which directly connect to the same router, that router may take up to three minutes to recognize that the link has failed and re-route traffic to the VIPA address via one of the still active interface adapters due to the router protocols. In some cases, the TCP connection will time out during that three-minute delay. If the connection times out, the user must re-establish the connection after the three-minute delay has completed. Even if the TCP connection does not time out, the three-minute delay significantly reduces productivity and may lead end users to mistakenly assume the connection has been terminated.

Furthermore, if one link fails between two routers that are directly connected by two or more links, the routers may need up to three minutes to establish a new route over one of the still functioning links for traffic that was using the failed link. In some cases, a TCP connection that was using the failed link will time out during that three-minute delay. If the connection times out, the user must re-establish the connection after the three-minute delay has completed. Even if the TCP connection does not time out, the three-minute delay, again, significantly reduces productivity and may lead end users to mistakenly assume the connection has been terminated.

RELATED APPLICATIONS

Application Ser. No. 08/755,420 entitled "Virtual Internet Protocol (IP) Addressing" filed on Nov. 22, 1996 and assigned to the assignee of the present invention.

Application Ser. No. 08/761,469 entitled "Host Identity Takeover Using Virtual Internet Protocol (IP) Addressing" filed on Dec. 6, 1996 and assigned to the assignee of the present invention.

Application Ser. No. 08/792,607 entitled "Session Traffic Splitting" filed on Jan. 31, 1997 and assigned to the assignee of the present invention.

SUMMARY OF THE INVENTION

The present invention allows the host whose link has failed, to send, to a router directly attached through another active link, a message that will cause the router to immediately re-route over an active link to the host any traffic that was using the failed link to communicate with a VIPA address on the host. Without significantly increasing the cost of the network, the present invention enhances the fault tolerance of a TCP/IP network using hosts with multiple or redundant devices or network interface adapters by reducing the time between the failure of a link and the resumption of traffic flow across a backup link. This is accomplished by the use of a virtual device, a virtual adapter, a virtual IP address (VIPA), and a message specially designed to notify the directly attached routers when a link has failed.

Furthermore, the present invention allows a router directly attached to a second router via two or more links, one of which has failed, to send to the second router a message that will cause the second router to immediately re-route over an active link to the first router any traffic that was using the failed link for communications between the routers. Again, without significantly increasing the cost of the network, this aspect of the present invention enhances the fault tolerance of a TCP/IP network using routers with multiple or redundant devices or network interface adapters by reducing the time between the failure of a link and the resumption of traffic flow across a backup link. This is accomplished by the use of a message specially designed to notify the directly attached routers when a link has failed.

DETAILED DESCRIPTION OF THE PREFERRED EMBODIMENT

There are two general cases which exemplify the usefulness of the present invention. The first is the case of multiple host-to-router connections. The second is the case of multiple router-to-router connections. Each of these cases will be examined individually.

First, in the case of a host and a router directly connected by two or more links, the preferred embodiment of the present invention is implemented in, but not limited to, an IBM MVS host running the TCP/IP protocol and directly connected to a router by two or more links. It allows for an IP address that selects a TCP/IP stack (and an MVS image if there is only one stack on the MVS image) without selecting a specific network device or attachment. Other hosts that connect to MVS TCP/IP applications can send data to the MVS virtual IP address via whatever paths are selected by the routing protocols. Should one of the links between the MVS host and a directly attached router fail, the MVS host can send a message to the directly attached router notifying it that the link has failed, in such a way that the router will select one of the other direct links to the MVS host significantly faster than if the MVS host had not sent the special message which will be herein after referred to as a 'route-killer' message.

The means of accomplishing this in the preferred embodiment of the present invention is to have the MVS host check the status of each link at the end of a period called the interface poll interval. However, other means of having the host learn that a link has failed are acceptable; e.g., a system might use a message from the adapter that indicates that the link has failed. When the MVS host detects that a link has failed, it constructs a Routing Information Protocol (RIP) update message indicating that it can reach the VIPA address through the IP address associated with the failed link with a metric of 16. Routers interpret a metric of 16 to mean that the destination cannot be reached through this link. The MVS host sends this update via all the functioning direct links to the directly connected router. In order to have the router immediately mark this link as down, the route-killer message's IP header must have as its IP source address the IP address of the failed link, rather than the IP address of the link that actually is its source.

Figure 1:
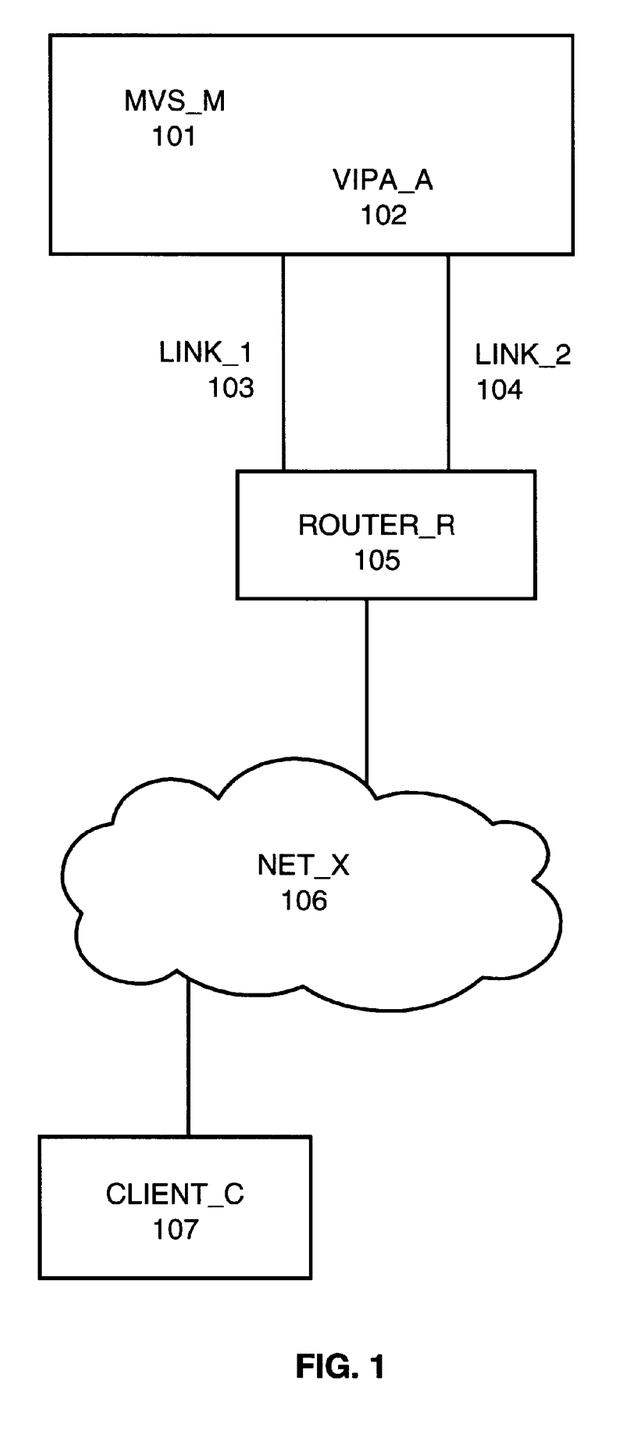
FIG. 1 depicts a representative network prior to the failure of a link that directly connects a host and a router.

FIG. 1 is a representative example of a network prior to failure of a link that directly connects a host MVS_M (101) and a router ROUTER_R (105). Host MVS_M (101) contains a virtual IP address (VIPA) called VIPA_A (102), along with two real physical links, LINK_1 (103) and LINK_2 (104), to ROUTER_R (105). In the present example ROUTER_R (105) also connects to an IP network NET_X (106), to which a client host CLIENT_C (107) also connects. In the present example, we assume that before LINK_1 (103) fails, ROUTER_R (105) routes via LINK_1 (103) all traffic originating in CLIENT_C (107) and destined for VIPA address VIPA_A (102) in MVS_M (101). Every thirty seconds MVS_M (101) sends to ROUTER_R (105) via LINK_1 (103) a route update message that indicates that LINK_1 (103) is a functional route to VIPA_A (102), and every thirty seconds MVS_M (101) sends to ROUTER_R (105) via LINK_2 (104) a route update message that indicates that LINK_2 (104) is a functional route to VIPA_A (102).

Figure 2:
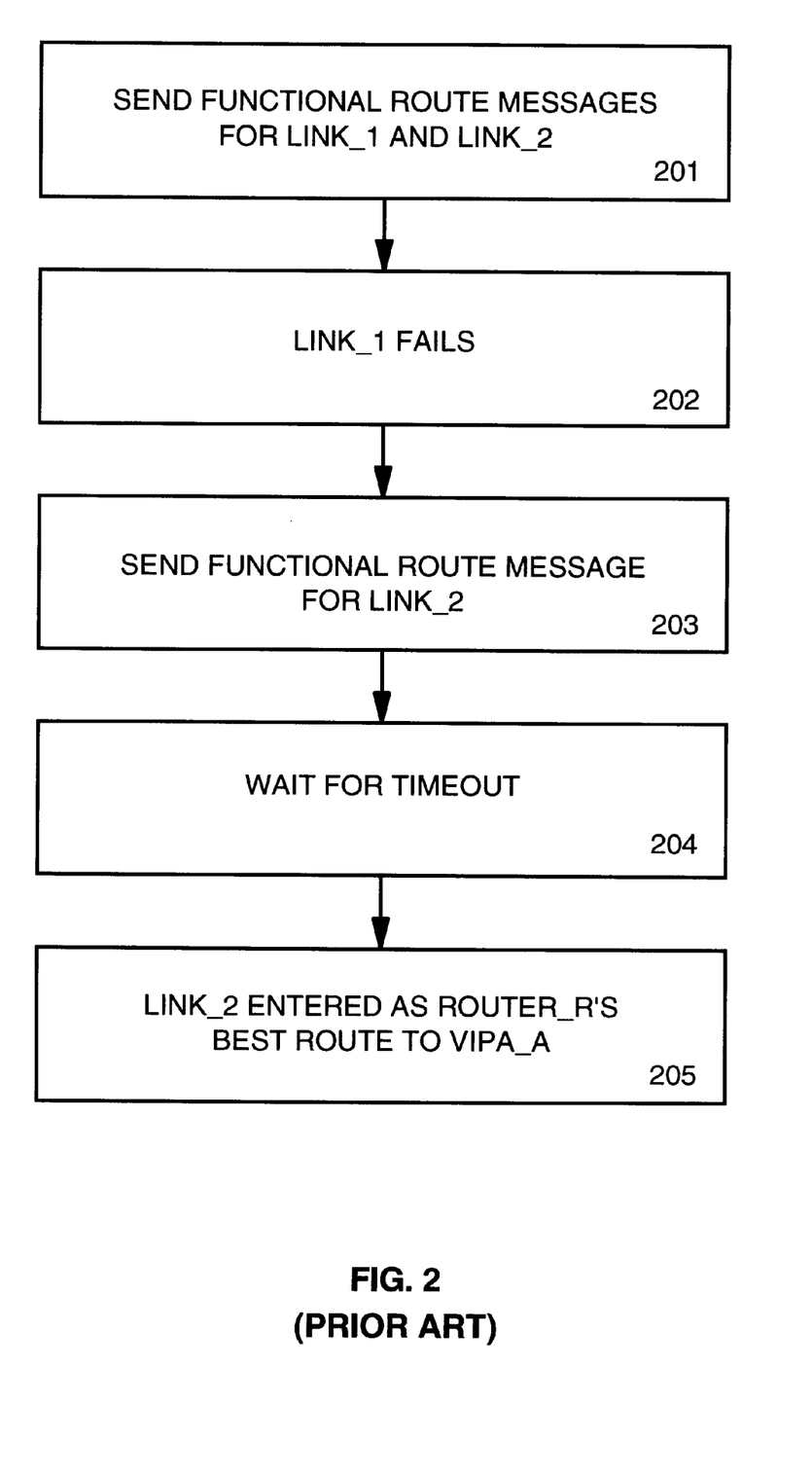
FIG. 2 demonstrates the logical flow of the recovery process between a host and router. (Prior Art).

FIG. 2 depicts the prior art method of updating the routes to indicate that a link has failed. The host sends a message to attached routers every 30 seconds indicating what routes are functional (201) to get to the VIPA address within the host. In the present example, every 30 seconds while LINK_1 and LINK_2 are functional, MVS_M would send a message to ROUTER_R indicating that the routes are functional. If a link were to fail (202), say LINK_1, MVS_M would no longer be able to send updates to ROUTER_R over LINK_1. MVS_M would continue to send functional route updates over LINK_2 (203) to ROUTER_R every 30 seconds while LINK_2 remained active. After a 90–180 second timeout (depending on the specific implementation), ROUTER_R would conclude that LINK_1 was inactive (204). ROUTER_R would then enter LINK_2 into it's best router table to VIPA_A (205) since ROUTER_R is still sending routing updates that indicate that LINK_2 is a functioning route to VIPA_A.

Figure 3:
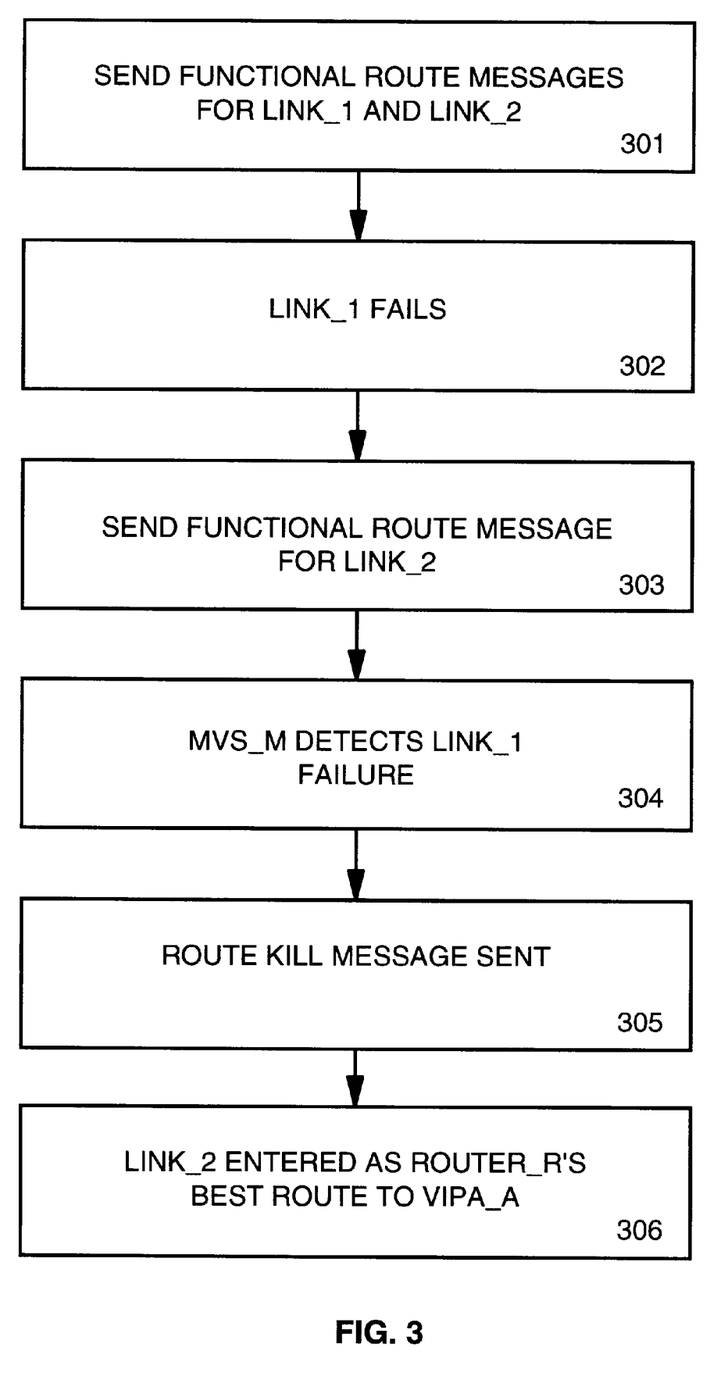
FIG. 3 demonstrates the logical flow of the faster recovery process between a host and router with this invention.

FIG. 3 demonstrates the process by which the present invention causes ROUTER_R to update its routing tables significantly more quickly than any of the prior art methods. While LINK_1 is functional, every thirty seconds MVS_M sends to ROUTER_R via LINK_1 a route update that indicates that LINK_1 is a functional route to VIPA_A, and while LINK_2 is functional, every thirty seconds MVS_M sends to ROUTER_R via LINK_2 a route update that indicates that LINK_2 is a functional route to VIPA_A (301). In the present example, we assume that ROUTER_R selects LINK_1 as the route to VIPA_A. When LINK_1 fails (302), MVS_M is unable to send route update messages to ROUTER_R via LINK_1. MVS_M continues to send to ROUTER_R via LINK_2 routing updates every thirty seconds that indicate that LINK_2 is a functioning route to VIPA_A (303). Every poll interval (a customer configurable value that may be as small as fifteen seconds) TCP/IP in MVS_M checks the status of all the links connected to it, and when MVS_M discovers that LINK_1 has failed (304), MVS_M constructs a routing update message that indicates that it cannot reach VIPA_A via LINK_1 (i.e., it sets the metric for that route to 16, which indicates that the destination is unreachable). MVS_M cannot send this to ROUTER_R via LINK_1, since LINK_1 not functioning. If MVS_M were to send this route update message to ROUTER_R via LINK_2 with the source IP address in this route update message's IP header set in the normal fashion to the IP address of the link via which it is sent, LINK_2, then ROUTER_R would interpret it as meaning that VIPA_A cannot be reached via LINK_2, which is not the information that MVS_M needs to convey to ROUTER_R. On the other hand, this invention causes MVS_M to send the route update message to ROUTER_R via LINK_2 (305) with the source IP address in the datagram's IP header set to the IP address of the failed link, LINK_1, so that ROUTER_R interprets this message as meaning that LINK_1 is not a viable route to VIPA_A and immediately removes LINK_1 from its routing tables, as desired. Since MVS_M has continued to send to ROUTER_R via LINK_2 routing updates that indicate that LINK_2 is a functioning route to VIPA_A, ROUTER_R immediately puts into its routing tables a route to VIPA_A via LINK_2 (306), and all traffic that it receives destined for VIPA_A now will be routed to VIPA_A in MVS_M via LINK_2. When MVS_M detects that LINK_1 is no longer functioning, it also changes its own routing tables so that it will send to ROUTER_R via LINK_2 traffic destined for CLIENT_C, since ROUTER_R advertises to MVS_M routes to CLIENT_C via LINK_2 as well as via LINK_1.

Figure 4:
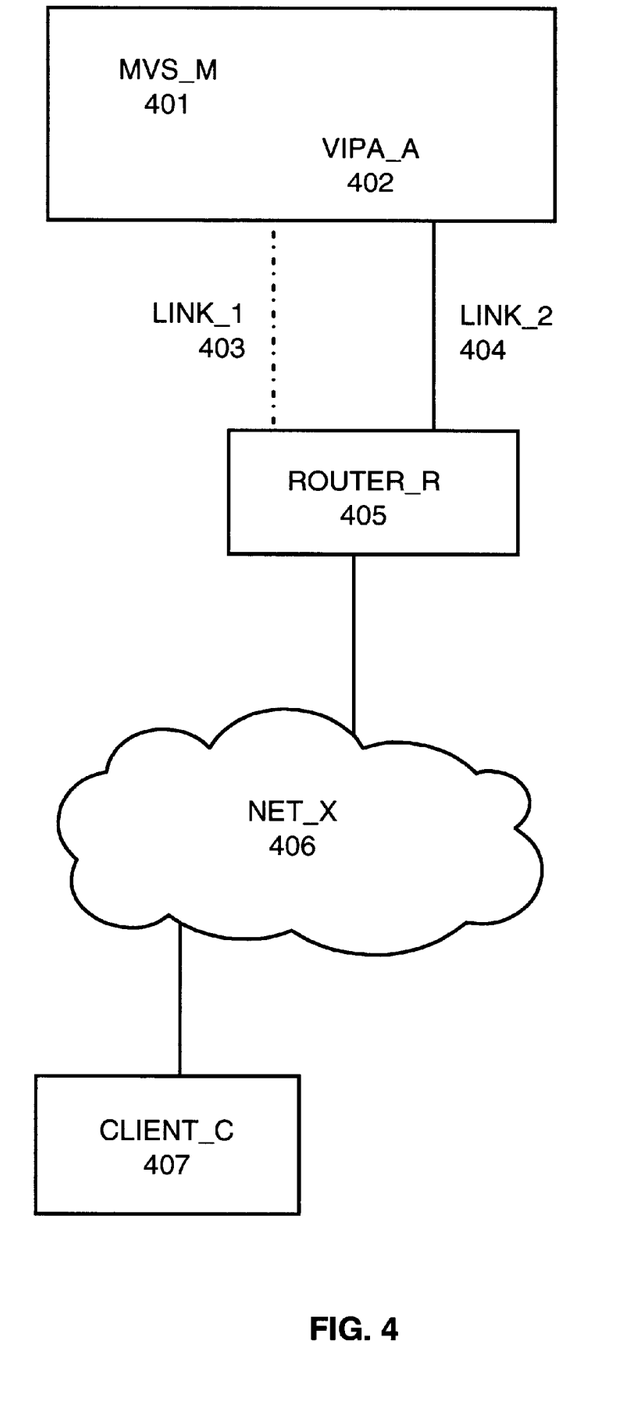
FIG. 4 depicts the representative network after the failure of one of the links that directly connects a host and a router.

FIG. 4 depicts the example network after LINK_1 (403) has failed and been removed from the routing tables in MVS_M (401) and ROUTER_R (405), and LINK_2 (404) has replaced LINK_1 as the route between MVS_M and ROUTER_R. Host MVS_M contains a virtual IP address (VIPA) called VIPA_A (402), along with a failed real physical link LINK_1, and a functioning real physical link LINK_2, the latter of which connects to ROUTER_R. In the present example, ROUTER_R also connects to an IP network NET_X (406), to which a client host CLIENT_C (407) also connects. In the present example, we assume that after LINK_1 has failed, ROUTER_R routes via LINK_2 all traffic originating in CLIENT_C and destined for VIPA address VIPA_A in MVS_M. Every 30 seconds MVS_M sends to ROUTER_R via LINK_2 a route update message that indicates that LINK_2 is a valid route to VIPA_A.

The second case that is addressed by the preferred embodiment of the present invention is that of multiple router-to-router links. In this case, rather than the link of interest being that between a host and a router, the links interest are between two routers.

If the configuration is as discussed in the previous example, except that instead of host MVS_M the configuration has another router ROUTER_M that further connects to another network NET_Y, then the preferred embodiment is as discussed above, except with ROUTER_M advertising routes to NET_Y instead of host MVS_M advertising routes to VIPA_A.

In the case of two routers directly connected by two or more links, the preferred embodiment of the present invention is implemented in, but not limited to, an IBM MVS system running the TCP/IP protocol and configured as an IP router, and connected to another router by two or more links. Should one of the links between the MVS system and a directly attached router fail, the MVS system can send a message to the directly attached router notifying it that the link has failed, in such a way that the router will select one of the other direct links to the MVS system significantly faster than if the MVS system had not sent the special route-killer message.

The means of accomplishing this is to have the MVS system check the status of each link at the end of each period called the interface poll interval. However, other means of having the system learn that a link has failed are acceptable; e.g., a system might use a message from the adapter that indicates that the link has failed. When the MVS system detects that a link has failed, it constructs a Routing Information Protocol (RIP) update message indicating that it can reach network NET_Y through the IP address associated with the failed link with a metric of 16. Routers interpret a metric of 16 to mean that the destination cannot be reached through this link. The MVS system sends this update via all the functioning direct links to the directly connected router. In order to have that router immediately mark this link as down, the route-killer message's IP header must have as its IP source address the IP address of the failed link, rather than the IP address of the link that actually is its source.

Figure 5:
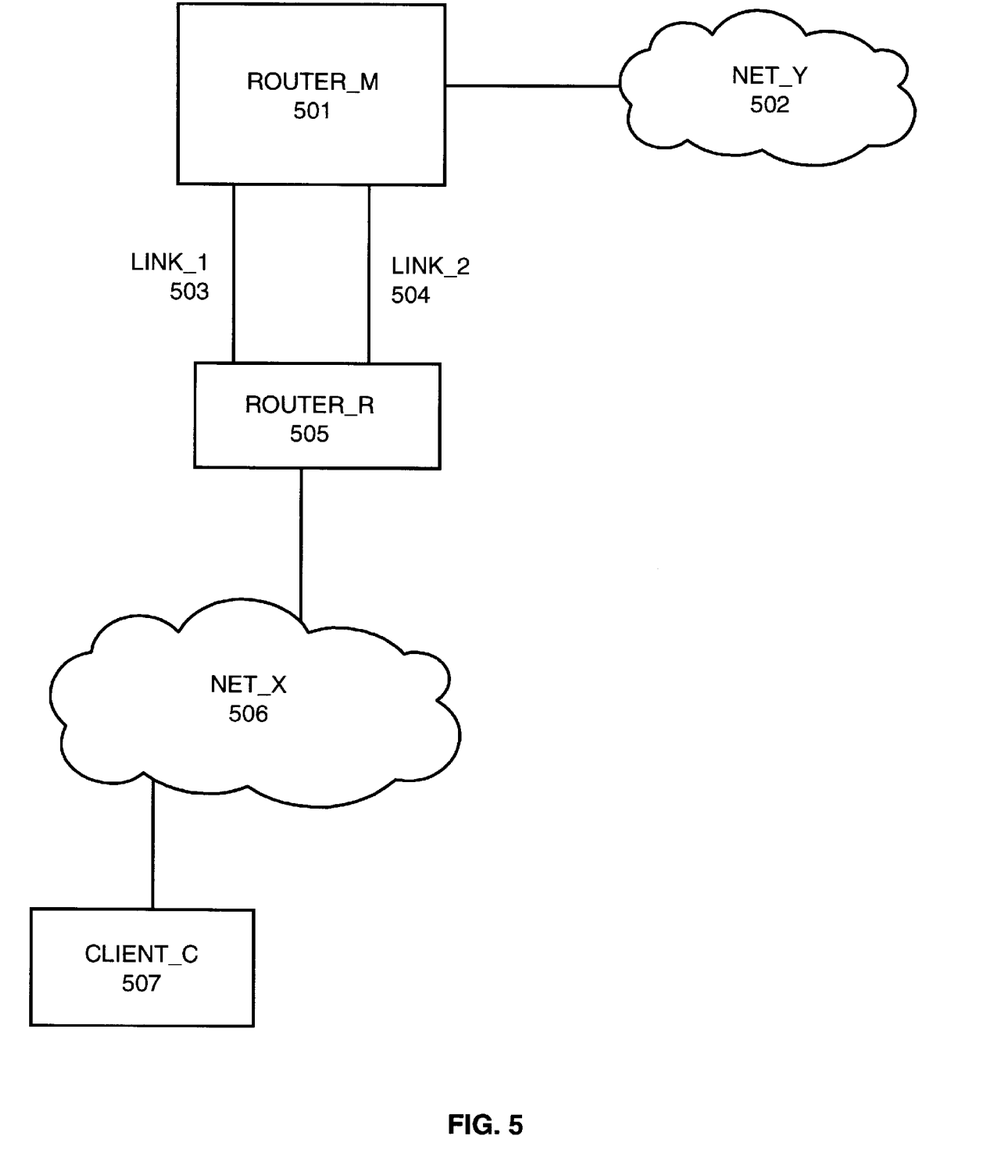
FIG. 5 depicts a representative network prior to the failure of a link that directly connects two routers.

FIG. 5 is a representative example of a network prior to failure of a link that directly connects a router ROUTER_M (501) and a router ROUTER_R (505). ROUTER_M (501) has a direct connection to an IP network NET_Y (502), along with two real physical links, LINK_1 (503) and LINK_2 (504), that connect it to ROUTER_R (505). In the present example ROUTER_R (505) also connects to an IP network NET_X (506), to which a client system CLIENT_C (507) also connects. In the present example, we assume that before LINK_1 (503) fails, ROUTER_R (505) routes to ROUTER_M (501) via LINK_1 (503) all traffic originating in CLIENT_C (507) and destined for NET_Y (502). Every thirty seconds ROUTER_M (501) sends to ROUTER_R (505) via LINK_1 (503) a route update message that indicates that LINK_1 (503) is a functional route to NET_Y (502), and every thirty seconds ROUTER_M (501) sends to ROUTER_R (505) via LINK_2 (504) a route update message that indicates that LINK_2 (504) is a functional route to NET_Y (502).

Figure 6:
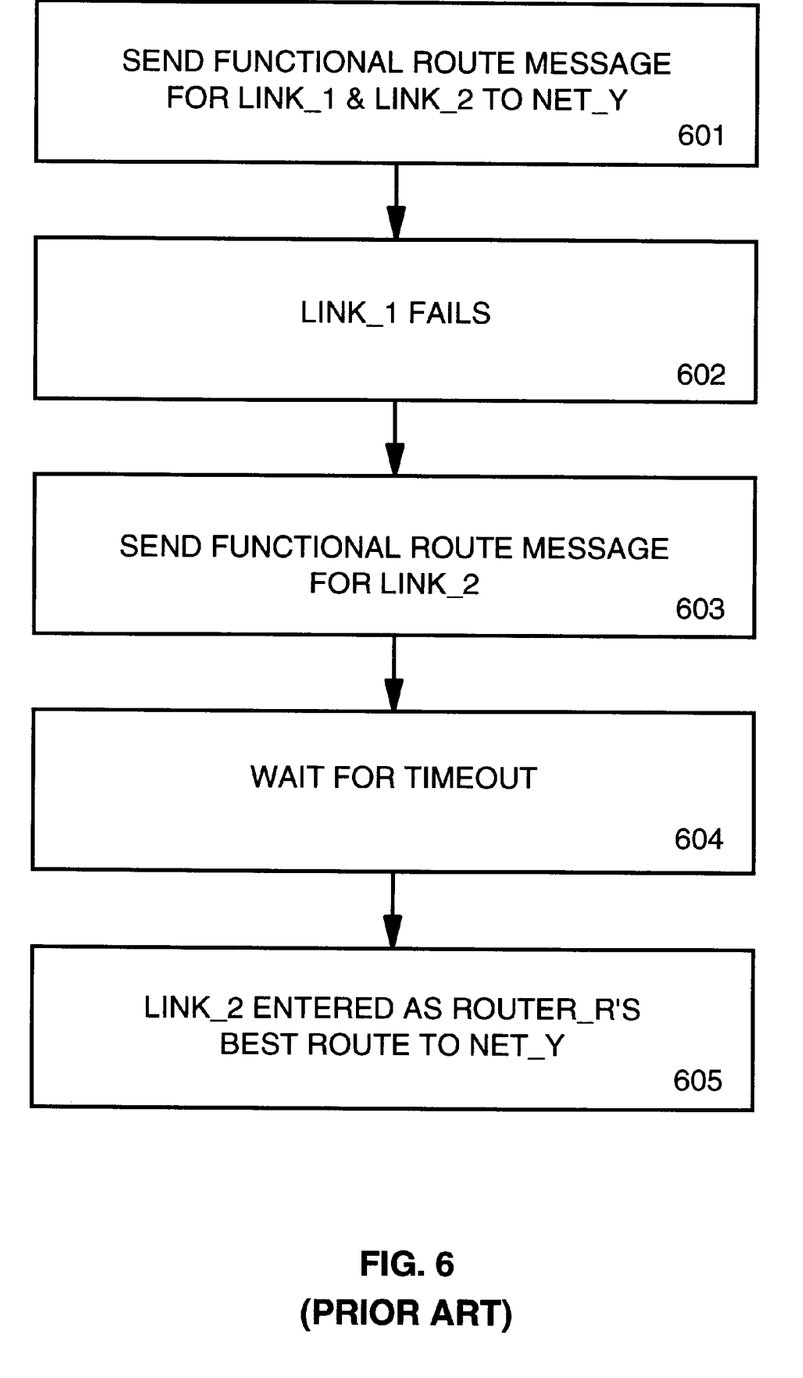
FIG. 6 demonstrates the logical flow of the recovery process between two routers. (Prior Art)

FIG. 6 demonstrates the prior art process by which, after LINK_1 fails, updates are made to the routing tables in ROUTER_R to route traffic destined for NET_Y. While LINK_1 is functional, every thirty seconds ROUTER_M sends to ROUTER_R over LINK_1 a route update that indicates that LINK_1 is a functional route to NET_Y, and while LINK_2 is functional, every thirty seconds ROUTER_M sends to ROUTER_R over LINK_2 a route update that indicates that LINK_2 is a functional route to NET_Y (601). In the present example, we assume that ROUTER_R selects LINK_1 as the route to NET_Y. After LINK_1 fails (602), ROUTER_M cannot send route update messages to ROUTER_R via LINK_1. ROUTER_M continues to send to ROUTER_R via LINK_2 routing updates that indicate that LINK_2 is a functioning route to NET_Y (603). After 90 to 180 seconds (depending on the specific implementation) have passed during which ROUTER_R has not received from ROUTER_M a route update message that indicates that LINK_1 is a valid route to NET_Y, ROUTER_R will conclude that LINK_1 is not functioning (604). Since ROUTER_M has continued to send to ROUTER_R via LINK_2 routing updates that indicate that LINK_2 is a functioning route to NET_Y, ROUTER_R then puts into its routing tables a route to NET_Y via LINK_2, and ROUTER_R will start routing datagrams destined to NET_Y over LINK_2 (605).

Figure 7:
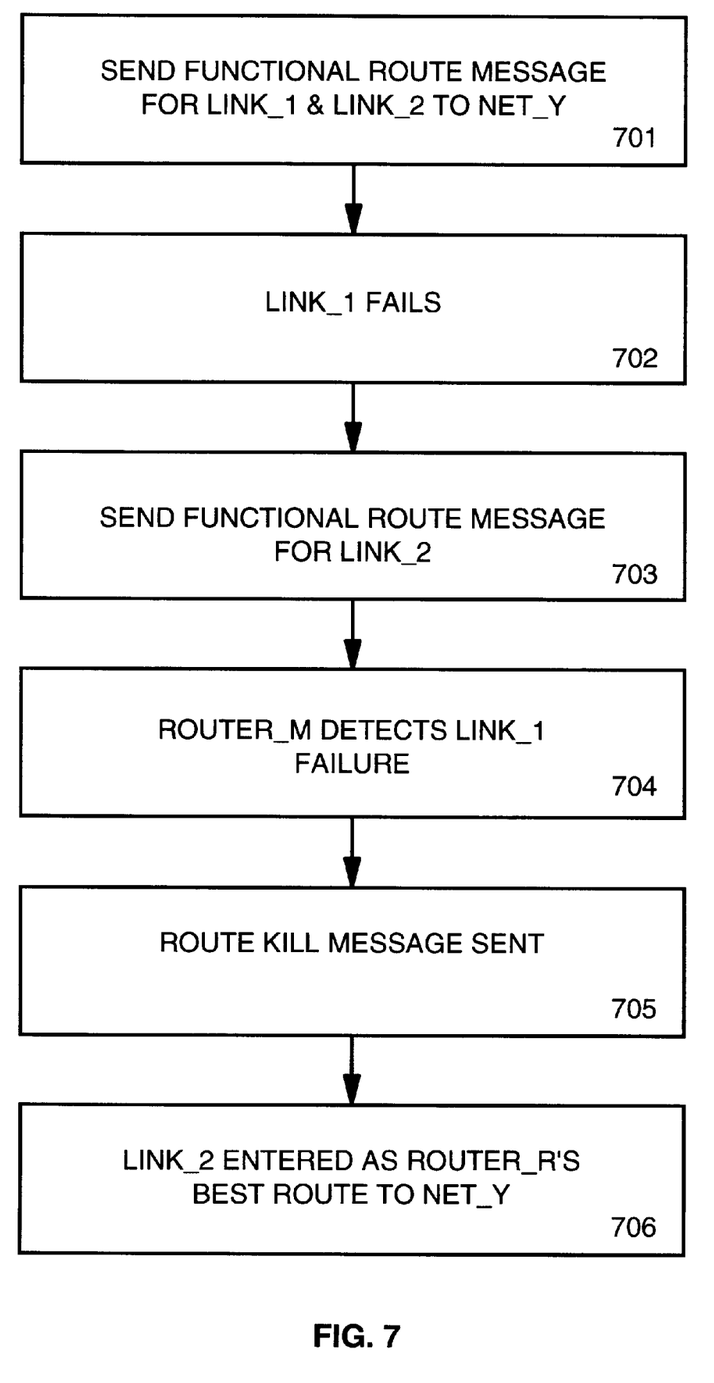
FIG. 7 demonstrates the logical flow of the faster recovery process between two routers with this invention.

FIG. 7 demonstrates the process by which the present invention causes ROUTER_R to update its routing tables significantly more quickly than with prior art. While LINK_1 is functional, every thirty seconds ROUTER_M sends to ROUTER_R via LINK_1 a route update that indicates that LINK_1 is a functional route to NET_Y, and while LINK_2 is functional, every thirty seconds ROUTER_M sends to ROUTER_R via LINK_2 a route update that indicates that LINK_2 is a functional route to NET_Y (701). In the present example, we assume that ROUTER_R selects LINK_1 as the route to NET_Y. After LINK_1 fails (702), ROUTER_M cannot send route update messages to ROUTER_R via LINK_1. ROUTER_M continues to send to ROUTER_R via LINK_2 routing updates every thirty seconds that indicate that LINK_2 is a functioning route to NET_Y (703). Every poll interval (a customer configurable value that may be as small as fifteen seconds) TCP/IP in ROUTER_M checks the status of all the links connected to it, and when ROUTER_M discovers that LINK_1 has failed (704), ROUTER_M constructs a routing update message, or route-killer message, that indicates that it cannot reach NET_Y via LINK_1 (in our preferred embodiment, it sets the metric for that route to 16, which indicates that the destination is unreachable). ROUTER_M cannot send this to ROUTER_R via LINK_1, since LINK_1 is not functioning. If ROUTER_M were to send this route update message to ROUTER_R via LINK_2 with the source IP address in this route update message's IP header set in the normal fashion to the IP address of the link via which it is sent, LINK_2, then ROUTER_R would interpret it as meaning that NET_Y cannot be reached via LINK_2, which is not the information that ROUTER_M needs to convey to ROUTER_R. On the other hand, this invention causes ROUTER_M to send the route update message to ROUTER_R via LINK_2 (705) with the source IP address in datagram's IP header set to the IP address of the failed link, LINK_1, so that ROUTER_R interprets this message as meaning that LINK_1 is not a viable route to NET_Y and immediately removes LINK_1 from its routing tables, as desired. Since ROUTER_M has continued to send to ROUTER_R via LINK_2 routing updates that indicate that LINK_2 is a functioning route to NET_Y, ROUTER_R immediately puts into its routing tables a route to NET_Y via LINK_2 (706), and all traffic that it receives destined for NET_Y now will be routed through ROUTER_M via LINK_2. When ROUTER_M detects that LINK_1 is no longer functioning, it also changes its own routing tables so that it will send to ROUTER_R via LINK_2 traffic destined for CLIENT_C, since ROUTER_R advertises to ROUTER_M routes to CLIENT_C via LINK_2 as well as via LINK_1.

Figure 8:
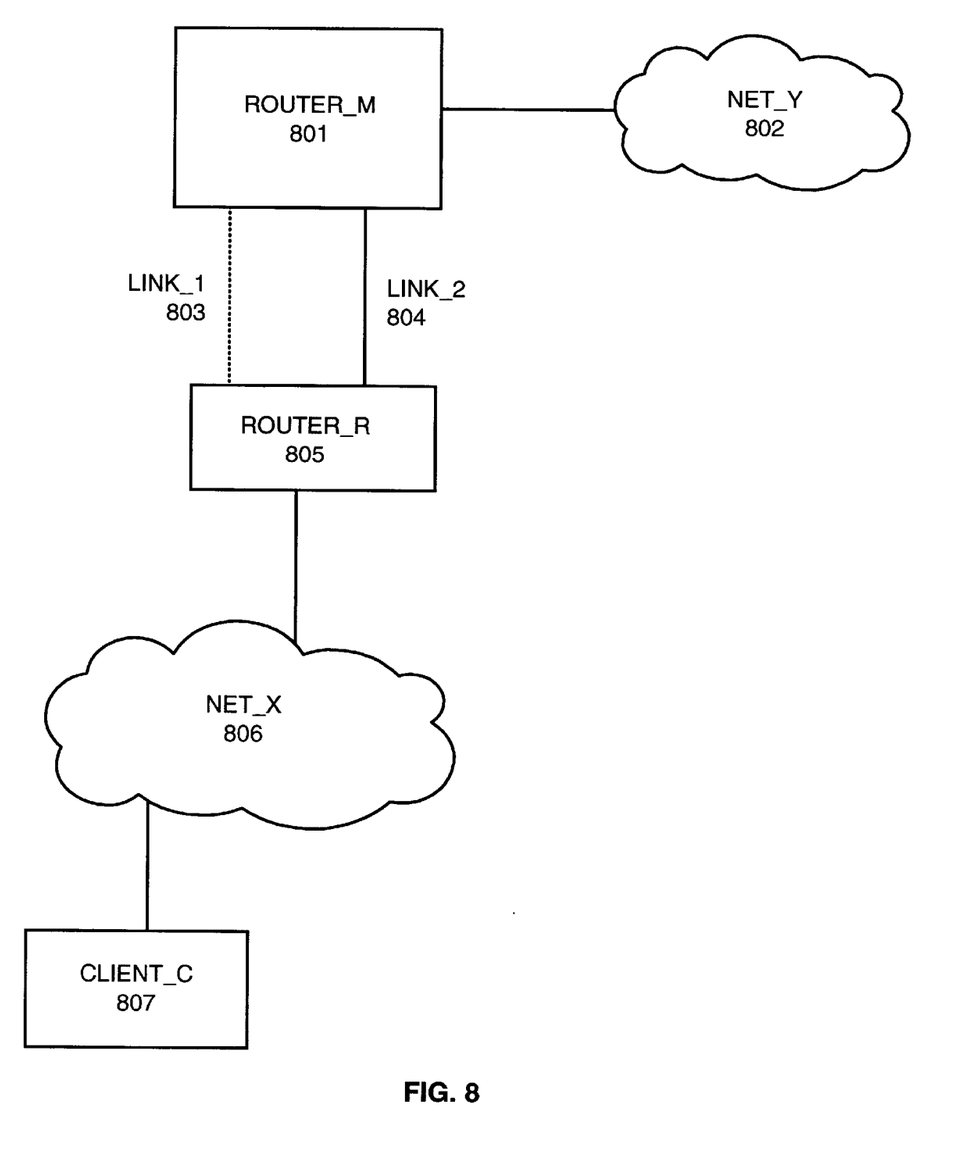
FIG. 8 depicts the representative network after the failure of one of the links that directly connects two routers.

FIG. 8 depicts the example network after LINK_1 (803) has failed and been removed from the routing tables in ROUTER_M (801) and ROUTER_R (805), and LINK_2 (804) has replaced LINK_1 as the route between ROUTER_M and ROUTER_R. ROUTER_M has a direct connection to an IP network called NET_Y (802), along with a failed real physical link LINK_1, and a functioning real physical link LINK_2, the latter of which connects to ROUTER_R. In the present example, ROUTER_R also connects to an IP network NET_X (806), to which a client system CLIENT_C (807) also connects. In the present example, we assume that after LINK_1 has failed, ROUTER_R routes via LINK_2 all traffic originating in CLIENT_C and destined for NET_Y. Every thirty seconds ROUTER_M sends to ROUTER_R via LINK_2 a route update message that indicates that LINK_2 is a valid route to NET_Y.

What is claimed is:

1. A method of error recovery in a TCP/IP routing system having at least two TCP/IP connections between a first TCP/IP communications device and a second TCP/IP communications device, the method comprising the steps of:

determining at the first TCP/IP communication device if a first of the at least two TCP/IP connections between the first TCP/IP communication device and the second TCP/IP communication device has failed;

transmitting over a TCP/IP connection other than the first TCP/IP connection from the first TCP/IP communications device to the second TCP/IP communications device a TCP/IP message indicating the first TCP/IP connection has failed;

receiving, at the second TCP/IP communications device, the TCP/IP message indicating that the first TCP/IP connection has failed; and responsive to receiving the TCP/IP message from the first TCP/IP communications device, routing TCP/IP messages to the first TCP/IP communications device over a TCP/IP connection other than the first TCP/IP connection; and for removing from a routing table resident at the second TCP/IP communications device the first TCP/IP connection; and adding to the routing table a connection other than the first TCP/IP connection from which the TCP/IP message was received.

2. A method according to claim 1, wherein the step of transmitting comprises the step of transmitting over each TCP/IP connection from the first TCP/IP communications device to the second TCP/IP communications device other than the first TCP/IP connection from the first TCP/IP communications device to the second TCP/IP communications device a TCP/IP message indicating the first TCP/IP connection has failed.

3. A method according to claim 1, wherein transmitting step further comprises the steps of:

generating a TCP/IP message having a metric of 16; and replacing a source address in the generated message with an address corresponding to the source of the first TCP/IP connection so as to indicate to the second TCP/IP communications device the TCP/IP connection which has failed.

4. A method according to claim 3, wherein the generated TCP/IP message is a Routing Information Protocol (RIP) update message.

5. A system for error recovery in a TCP/IP routing system having at least two TCP/IP connections between a first TCP/IP communications device and a second TCP/IP communications device, comprising:

means for determining at the first TCP/IP communication device if a first of the at least two TCP/IP connections between the first TCP/IP communication device and the second TCP/IP communication device has failed;

means for transmitting over a TCP/IP connection other than the first TCP/IP connection from the first TCP/IP communications device to the second TCP/IP communications device a TCP/IP message indicating the first TCP/IP connection has failed;

means for receiving, at the second TCP/IP communications device, the TCP/IP message indicating that the first TCP/IP connection has failed; and means, responsive to receiving the TCP/IP message from the first TCP/IP communications device, for routing TCP/IP messages to the first TCP/IP communications device over a TCP/IP connection other than the first TCP/IP connection; and means for removing from a routing table resident at the second TCP/IP communications device the first TCP/IP connection; and means for adding to the routing table a connection other than the first TCP/IP connection from which the TCP/IP message was received.

6. A system according to claim 5, wherein the means for transmitting comprises means for transmitting over each TCP/IP connection from the first TCP/IP communications device to the second TCP/IP communications device other than the first TCP/IP connection from the first TCP/IP communications device to the second TCP/IP communications device a TCP/IP message indicating the first TCP/IP connection has failed.

7. A system according to claim 5, wherein the means for transmitting further comprises:

means for generating a TCP/IP message having a metric of 16; and means for replacing a source address in the generated message with an address corresponding to the source of the first TCP/IP connection so as to indicate to the second TCP/IP communications device the TCP/IP connection which has failed.

8. A system according to claim 7, wherein the generated TCP/IP message is a Routing Information Protocol (RIP) update message.

* * * * *